US005574949A

United States Patent [19]

Tsurumi

[11] Patent Number: 5,574,949

[45] Date of Patent: Nov. 12, 1996

[54] MULTI-ACCESS LOCAL AREA NETWORK USING A STANDARD PROTOCOL FOR TRANSMITTING MIDI DATA USING A SPECIFIC DATA FRAME PROTOCOL

[75] Inventor: Kanehisa Tsurumi, Hamamatsu, Japan

[73] Assignee: Yamaha Corporation, Hamamatsu, Japan

[21] Appl. No.: 163,065

[22] Filed: Dec. 6, 1993

[30] Foreign Application Priority Data

Dec. 7, 1992 [JP] Japan .................................... 4-351276

[51] Int. Cl.$^{6}$ ........................................................ G06F 7/24

[52] U.S. Cl. ........................ 395/850; 395/891; 364/239.3; 364/265.2; 364/240.1; 364/DIG. 1

[58] Field of Search .................................... 395/200, 850, 395/891; 84/645

[56] References Cited

U.S. PATENT DOCUMENTS 5,054,359 10/1991 Hikawa .................................... 84/645

5,079,984 1/1992 Kosugi et al. ............................ 84/645

5,283,819 2/1994 Glick et al. ............................... 379/90

OTHER PUBLICATIONS

Ramos et al, "Data Communications & Networking Fundamentals Using Novell Netware" Feb. 1992 pp. (121–128).

*Primary Examiner*—Thomas C. Lee
*Assistant Examiner*—Sang Hui Kim
*Attorney, Agent, or Firm*—Loeb & Loeb LLP

[57] ABSTRACT

In a multi-access local area network, a plurality of stations employing a predetermined protocol (e.g., a protocol based on a CSMA/CD system) are linked together by a bus. In order to transmit MIDI data in the multi-access local area network, another station employing a certain protocol which is suitable for transmitting the MIDI data is further provided and is designed to perform a frequency modulation by a unit of word. The protocol employed by another station defines a specific frame form which is based on a start-stop system. The specific frame form contains a sequence of a preamble, a start bit, a data portion and a stop bit. An optimum bit pattern which is suitable for the transmission of the MIDI data is selected for the preamble.

6 Claims, 2 Drawing Sheets

MULTI-ACCESS LOCAL AREA NETWORK USING A STANDARD PROTOCOL FOR TRANSMITTING MIDI DATA USING A SPECIFIC DATA FRAME PROTOCOL

BACKGROUND OF THE INVENTION

1. Field of the Invention

The present invention relates to a multi-access local area network which allows an effective data transmission for MIDI data and the like.

2. Prior Art

As a local area network (i.e., LAN) using a multi-access bus, a LAN of a type of carrier sense multiple access (shortened as "CSMA") is known. Such CSMA-type LAN performs a carrier sensing and is designed to acknowledge an existence of signals on the bus prior to the data transmission. On the other hand, a CSMA/CD-type LAN is known as an improve type of the CSMA-type LAN. The term "CSMA/CD" is known as CSMA with Collision Detection. In the CSMA/CD-type LAN, a current station detects whether or not a data collision is occurred during a transmission of frames, so that the station can judge whether or not the 'transmission is completed. A so-called "Ethernet" is well known as the CSMA/CD-type LAN. In these of LANs, a carrier detection system (or collision detection system) does not depend upon the frame form to be used or the coding method to be if it satisfies the predetermined conditions.

In the above-mentioned LANs, it may be possible to transmit the MIDI data (i.e., data based on the standard of Musical Instruments Digital Interface) by a predetermined frame form. In this case, the frame form depends on the LAN to be actually used, so that MIDI data should be stored in a data portion of the frame to be transmitted. This means that a gateway (or protocol conversion) is made by the software. Thus, transmit/receive-side adapter circuits to be connected between the bus and a MIDI musical instrument must be complicated in configuration or the cost thereof should become higher, which is a drawback for the conventional LAN.

SUMMARY OF THE INVENTION

Accordingly, it is an object of the present invention to provide a multi-access LAN which is capable of transmitting several kinds of data each defined by a different type of protocol.

The present invention is applicable for the LAN in which a plurality of stations, employing a predetermined protocol based on the CSMA system, are linked together by a bus. The multi-access LAN as defined by the present invention is characterized by further providing another station receiving data based on a specific protocol which is different from the protocol employed by a plurality of stations. Thus, another station modulates and transmits such data onto the bus. More specifically, another station receives start-stop-system synchronous signals (e.g., MIDI signals), so that the signals are subjected to a frequency modulation by a unit of word.

According to the present invention, the continuous signals or asynchronous signals are modulated; and then, those signals are converted into frames of data. Thereafter, those frames are sequentially transferred in the LAN. Thus, it is possible to transmit different types of data each having a different protocol (represented by a specific signal coding method and a specific physical framing method) by use of the common bus. According to the present invention, even when the MIDI data are transmitted in the Ethernet, the circuit configuration of the receive-side adapter can be simplified. In the transmit-side adapter, even though a high-speed processing may be required for controlling the coding/decoding manner and collision-detection/retransmission manner, the circuit configuration can be simplified. Even when the MIDI data are transmitted by a unit of MIDI message, the transmission can be performed at a predetermined MIDI rate (i.e., 320 μs per one byte), which does not require a high-speed processing.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings.

DESCRIPTION OF THE PREFERRED EMBODIMENT

Figure 1:
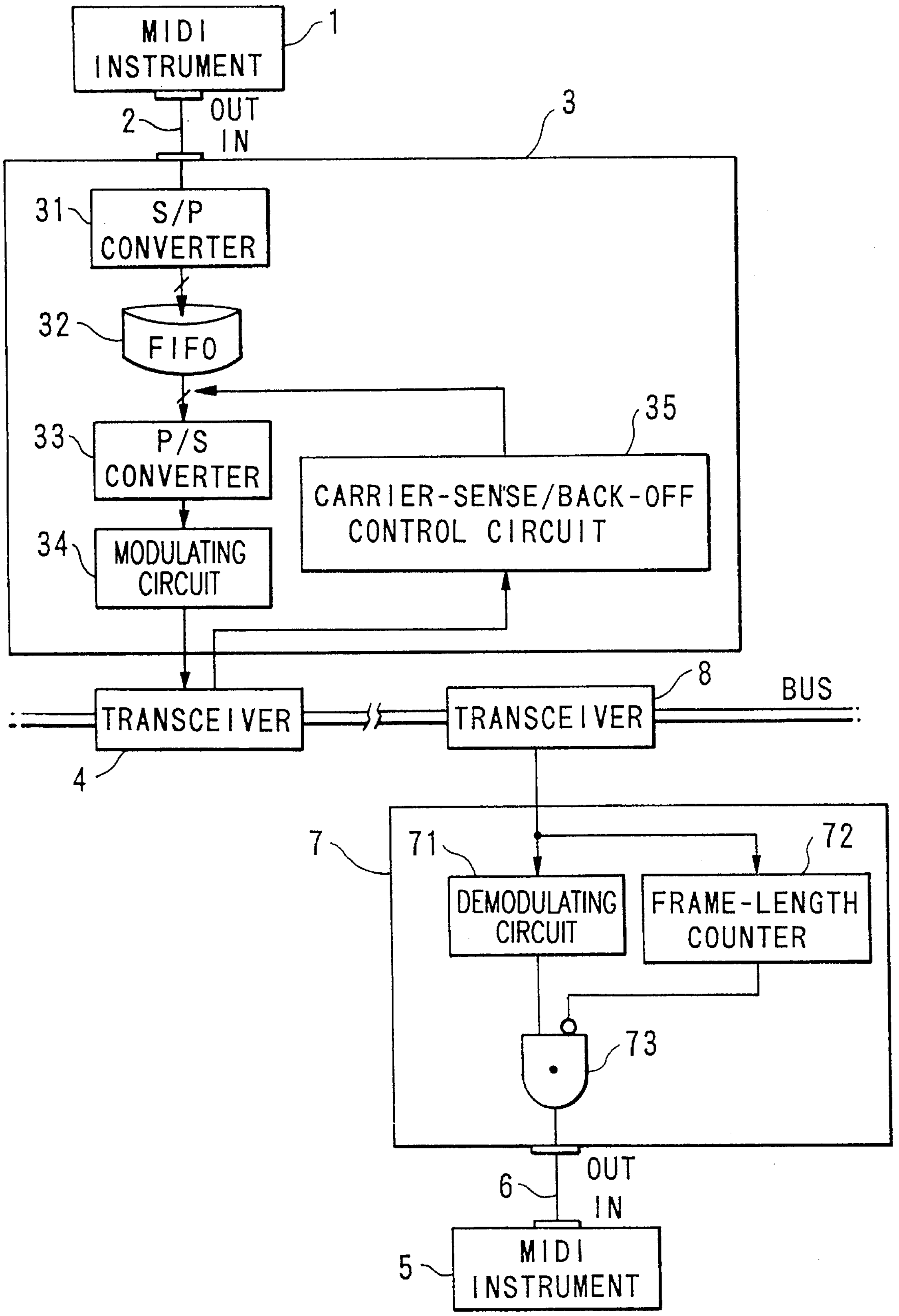
FIG. 1 is a block diagram showing an essential part of a multi-access LAN according to an embodiment of the present invention.

Now, a preferred embodiment of the present invention will be described in detail by referring to the drawings.

FIG. 1 is a block diagram showing an essential part of a multi-access LAN according to an embodiment of the present invention. The aforementioned "Ethernet" as the CSMA/CD-type protocol is employed. Therefore, the MIDI data is transmitted through the bus according to the CSMA/CD-type protocol linking a transmit-side adaptor and a receive-side adaptor together.

In FIG. 1, a transmit-side MIDI instrument 1 is connected with a transmit-side adaptor 3 through a MIDI cable 2, and the transmit-side adaptor 3 is connected with a transceiver 4 provided on the bus. On the other hand, a receive-side MIDI instrument 5 is connected with a receive-side adaptor 7 through a MIDI cable 6, and the receive-side adaptor 7 is connected with a transceiver 8 provided on the bus.

The transmit-side adaptor 3 is configured by a serial-to-parallel converter 31 (denoted to as "S/P converter"), a FIFO buffer 32 (in which a term "FIFO" is an acronym for First-In- First-Out), a parallel-to-serial converter 33 (denoted to as "P/S converter"), a modulating circuit 34 and a carrier-sense/back-off control circuit 35. The aforementioned transmit-side MIDI instrument 1 produces the MIDI data in an asynchronous manner (i.e., a manner of start-stop transmission). Then, the MIDI data are subjected to serial-to-parallel conversion by the S/P converter, so that parallel data are obtained. The parallel data are stored in the FIFO buffer 33. Thereafter, the parallel data outputted from the FIFO buffer 33 are re-converted into serial data by the P/S converter. The modulating circuit 34 modulates output data of the P/S converter 33 on the basis of the frequency modulation; and then, modulated data are transferred onto the bus.

Both of the S/P converter 31 and the FIFO buffer 33 are provided to convert each word of the MIDI data into a frame. On the basis of a receiving signal and a collision detection signal given from the transceiver 4, the carrier-sense/back-off control circuit 35 controls a transmission start timing at which the data is transferred from the transmit-side adaptor 3 onto the bus.

On the other hand, the receive-side adaptor 7 is configured by a demodulating circuit 71, a frame-length counter 72 and a gate circuit 73. Herein, the demodulating circuit 71 demodulates the data which is transmitted from the transmit-side adaptor 3 on the basis of the MIDI data outputted from the transmit-side MIDI instrument 1 and which is received by the transceiver 8. Under the operations of the frame-length counter 72 and the gate circuit 73, the data demodulated by the demodulating circuit 71 is formatted by each frame. Then, the data outputted through the gate circuit 73 is supplied to the receive-side MIDI instrument 5.

Figure 2A:
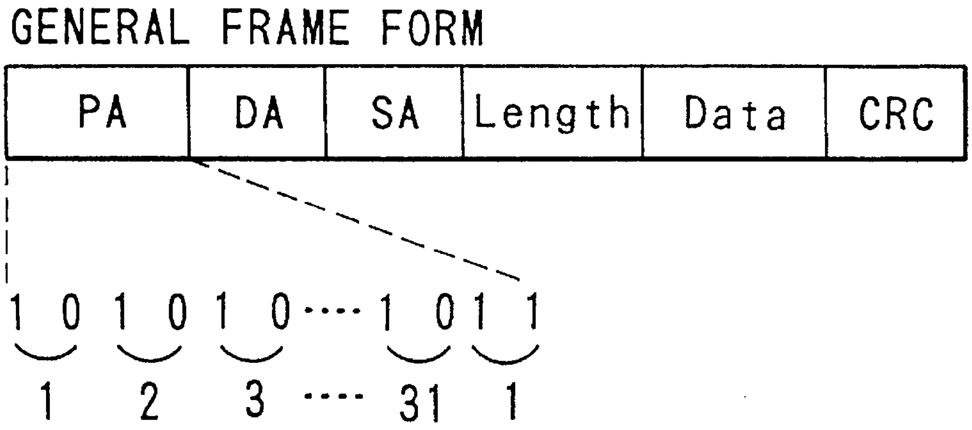
FIG. 2(A) shows a frame form generally defined by the CSMA/CD-type protocol.
Figure 2B:
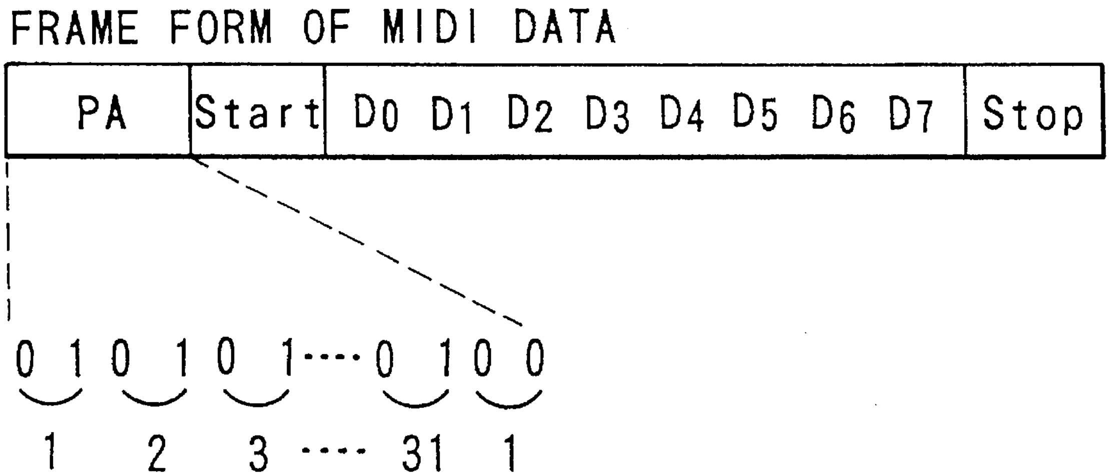
FIG. 2(B) shows a frame form used for the MIDI data.

FIGS. 2(A) and 2(B) show frame forms. Herein, FIG. 2(A) shows a general frame form used in the aforementioned Ethernet employing the CSMA/CD-type protocol. Herein, a transmission rate is set at 10 MHz, while a bi-phase coding method (i.e., Manchester coding method) employing a phase modulation method is used. In a bit pattern shown in FIG. 2(A), a preamble PA is configured by thirty-one pairs of bits "10" and one pair of bits "11". In FIG. 2(A), a portion DA following the preamble PA represents a destination address for the data transmission, while its sequential portion SA represents a source address for the data transmission. In addition, a portion "Length" following the portion SA represents a data length of a data portion "Data". A final portion "CRC" following the data portion "Data" represents an error checking code. By use of the error checking code CRC, it is possible to remove an abnormal frame at the receive-side station.

In contrast, the MIDI instruments 1 and 5 use another frame form (simply, denoted to as MIDI frame form) which is suitable for the MIDI data as shown in FIG. 2(B). According to a bit pattern as shown in FIG. 2(B), a preamble PA is configured by thirty-one pairs of bits "01" and one pair of bits "00". As compared to the aforementioned preamble PA used in the general frame form, the preamble employed in the MIDI frame form has an inverted bit pattern. Of course, such inverted bit pattern does not substantially affect the operation of the preamble.

Following the preamble PA (representing the data transmission speed of 10 MHz) in the MIDI frame form, there are provided a start bit (denoted by "Start"), an 8-bit data portion (denoted by "DO" to "D7") and a stop bit (denoted by "Stop"). Herein, each of the start bit and stop bit is configured by one bit. The above-mentioned 10-bit portion (containing "Start", "DO" to "D7" and "Stop") represents the MIDI data which are start-stop-system synchronous signals having a transmission speed of 31.25 Kbps. In order to absorb a difference between the data transfer speed of the MIDI data and the data transfer speed used in the CSMA/CD-type LAN, the MIDI data are transmitted as a sequence of 3200 bits on the bus. That is, since one bit of the MIDI signal from the MIDI instrument 1 corresponds to a time 32 μs (i.e., 1/31,250 second), the same data are continuously transmitted on the bus during a period of time corresponding to 320 bits (i.e, 32μs ×10 MHz) used in the CSMA/CD-type LAN.

Next, a transmission manner of the MIDI data will be described below.

The MIDI signal outputted from the MIDI instrument i is inputted into the transmit-side adapter 3 at its MIDI/IN connector. The MIDI signals are converted into parallel signals by the S/P converter 31; and then, the parallel signals are stored in the FIFO buffer 32 by a unit of word (i.e., 8 bits). At this time, the carrier-sense/back-off control circuit 35 performs a carrier sensing. According to an instruction from the carrier-sense/back-off control circuit 35, a signal of one word (i.e., 8-bit data) is read from the FIFO buffer 32. Then, this signal is converted into serial data by the P/S converter 33. Thereafter, the serial data is subjected to modulating operation by the modulating circuit 34; and then, the modulated data accompanied with a preamble is transmitted on the bus.

If no collision is detected, the data of one word stored in the FIFO buffer 32 is completely transmitted on the bus; and therefore, that data is neglected under the instruction from the carrier-sense/back-off control circuit 35. If a collision is detected, the data transmission is completed; and therefore, the transmit-side adapter 3 backs off an appropriate time under the instruction from the carrier-sense/back-off control circuit 35 in accordance with the binary-exponential-back-off algorithm, so that the data is transmitted again.

Among the frames, the receive-side adapter 7 receives only the frame having a preamble for the MIDI frame form by detecting the data "00" of the preamble. When the frame having the preamble for the MIDI frame form is transmitted to the receive-side adapter 7, the demodulating circuit 71 establishes a phase synchronization on the bi-phase signals of the preamble defined as the MIDI frame form; and that circuit also demodulates the bi-phase signals following the preamble. Thus, the demodulating circuit 71 outputs demodulated signals through a MIDI/OUT connector provided in the receive-side adaptor 7. At this time, the frame-length counter 72 detects the length of the frame received. If the length of the MIDI frame becomes too short under an effect of the collision, in other words, if the length of the MIDI frame is smaller than 320 μs, the frame-length counter 72 functions to control the gate circuit 73 such that a level of the signal to be outputted from the MIDI/OUT connector is retained at zero level until the above-mentioned duration of 320 μs is passed away. Thus, it is possible to avoid an error event in which a framing error is caused by the output signal of the receive-side adaptor 7.

As the coding method employed in the transmit-side station which transmits the MIDI signals, it is possible to employ a f/2f method belonging to the frequency modulation method. Herein, a digit "0" represents a usage of a fundamental wave, while a digit "1" represents a usage of another wave whose frequency is twice as large as the fundamental frequency. By use of the f/2f method, it is possible to effectively use the preamble. In the f/2f method, it is not necessary to establish a certain phase relationship at a boundary between a last part of the preamble and the next bit pattern. Therefore, a preamble represented by binary codes "000 . . . 0001" can be used for the CSMA frame, while another preamble represented by binary codes "111 . . . 1111" can be used for the MIDI frame.

Incidentally, the preamble is a bit pattern which is used for locking the PLL circuit. Therefore, the signals are not transmitted on the bus normally. At a start timing of the packets, the data of preamble are transmitted on the bus. A period of time in which those signals are not transmitted on the bus is called an idle time. In the data communication using the start-stop-synchronous system, a level of signal is normally set at "1" (or high level) during the idle time.

When using the above-mentioned simple preamble, no difference is required between the preamble and the idle time in the MIDI frame. For this reason, the receive-side station receiving the MIDI frame can simply and directly output a decoded digit "1" through the MIDI/OUT connector without identifying the preamble. In the transmit-side station transmitting the MIDI frame, the signal inputted into the MIDI/IN connector is delayed, while a signal level "1" is coded into a digit "1" which is merely transmitted just before the transmission of the start bit. This results in the transmission of the preamble.

In the embodiment described heretofore, the MIDI signal which is the asynchronous signal is transmitted by use of the specific frame form which is different from the frame form of the CSMA frame. However, the present invention is not limited by the teaching of the embodiment. In short, the present invention is effective even when the continuous signals are modulated and then transmitted on the existing Ethernet bus.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A multi-access local area network that uses a standard protocol and is for transmitting MIDI data between at least two MIDI devices, the network comprising:

at least one transmit-side adapter that accepts data from a first of the at least two MIDI devices and converts MIDI data to be transmitted on the multi-access local area network, the transmit-side adapter comprising:

a serial-to-parallel converter circuit for receiving and converting the MIDI data to produce parallel data that only forms data frames that represent an MIDI local area network transmission protocol which is different from and does not interfere with the standard protocol currently being used on the multi-access local area network, a storage buffer for storing the parallel data from the serial-to-parallel converter in a predetermined order of frames, a parallel-to-serial convertor circuit for receiving and converting data from the storage buffer in the predetermined order of frames to produce serial data frames, a modulating circuit to modulate and code the serial data frames for transmission on the multi-access local area network, and a carrier-sense/back-off control circuit that controls when the modulating circuit transmits the modulated data frames on the multi-access local area network; and at least one receive-side adapter that receives modulated data frames from the multi-access local area network that use the MIDI local area network protocol and converts the modulated data frames into MIDI data for a second of the at least two MIDI devices, the receive-side adapter comprising:

a decoding circuit to demodulate and decode each of the modulated data frames into MIDI data, a frame-length counter circuit to determine the length of each of the received modulated data frames to detect complete transmission of each of the modulated data frames, and a gate controlled by the frame-length counter circuit, wherein the gate passes the demodulated and decoded MIDI data for each modulated data frame to the second of the at least two MIDI devices when the framelength counter circuit detects a complete transmission of each of the modulated data frames.

2. The network according to claim 1, wherein each of the modulated data frames each include a preamble portion, a start portion, a data portion and a stop portion.

3. The network according to claim 2, wherein the preamble portion of each modulated data frame is an inversion of a standard CSMA/CD-type protocol preamble.

4. The network according to claim 2, wherein the start portion of each the modulated data frame is a single bit, and wherein the stop portion of each the modulated data frame is a single bit.

5. The network according to claim 2, wherein the data portion of each the modulated data frame is eight bits in length.

6. The network according to claim 1, wherein the modulating circuit utilizes an f/2f frequency modulation method.

* * * * *